United States Patent [19]

Goldstein

[11] Patent Number: 5,503,685
[45] Date of Patent: Apr. 2, 1996

[54] THERMALLY STIMULATED FOCUSED PHOTON SOURCES

[76] Inventor: Mark K. Goldstein, 2248 Del Mar Heights Rd., Del Mar, Calif. 92014

[21] Appl. No.: 85,117

[22] Filed: Jul. 2, 1993

[51] Int. Cl.⁶ .................. H01L 31/058; F21H 1/00; H02N 6/00
[52] U.S. Cl. .................. 136/253; 427/181; 427/226; 427/243; 427/294; 431/100; 431/253; 431/328
[58] Field of Search .................. 136/253; 431/100, 431/253, 328; 427/180–181, 226, 243, 294

[56] References Cited

U.S. PATENT DOCUMENTS

| | | | |
|---|---|---|---|
| 4,313,425 | 2/1982 | Crackel et al. | 126/678 |
| 4,584,426 | 4/1986 | Nelson | 136/253 |
| 4,836,862 | 6/1989 | Pelka et al. | 136/253 |
| 5,137,583 | 8/1992 | Parent et al. | 136/253 |
| 5,312,521 | 5/1994 | Fraas et al. | 136/253 |

Primary Examiner—Aaron Weisstuch
Attorney, Agent, or Firm—Christie, Parker & Hale

[57] ABSTRACT

Photon generating devices produce predetermined radiation spectral output and heat for a variety of applications including lighting and electric power generation, and provide photons to enhance chemical and physical reactions. Such a device comprises an emitter which contains metal oxides, means to heat the emitter sufficiently to produce large number of photons of a desired spectral output, and an optical means for directing the photons to various targets. In one embodiment, the device includes a thermal input device, a light pipe having a low emissivity, and an emitter coating of superemitter material which is thermally stimulated to emit radiation of a specific wavelength above a threshold temperature. An intermediate layer may be used to bond the emitter coating to the light pipe or other optical device where desired. Another embodiment comprises coating blackbody emitters onto transparent optical waveguides, such as light pipes, and heating the coating to emit photons into the light pipes which are directed to a target, and further comprises a means to select a particular target.

37 Claims, 4 Drawing Sheets

THERMALLY STIMULATED FOCUSED PHOTON SOURCES

FIELD OF THE INVENTION

The present invention relates to a means to efficiently produce, collect, and direct photons from an emitter, such as thermally stimulated superemitters which are capable of producing selected and/or broad wavelength spectral outputs for a variety of applications. These applications include lighting, cooking, laser pumps, heating fluids, and producing electric power when selected wavelengths are collected by photovoltaic materials. This invention uses an optical means to collect and select photons and then direct them to at least one target. A method of preparing such devices is also provided by the present invention. In addition, methods of raising the temperature of combustion to increase radiation output by increased photon output, which may provide higher efficiency electrical production, are also described.

BACKGROUND OF THE INVENTION

A variety of superemitting materials have been previously described in U.S. Pat. Nos. 4,776,895 and 4,793,799, both issued to Goldstein. Selective emission arises from such superemitting material due to the decay of inner electron shell transitions in a solid phase. Some superemitting materials often have an element present in a mixed oxidation or mixed valence state, forming a nonstoichiometric oxide. Some of the most effective superemitting materials in this class of compounds having mixed oxidation or mixed valance states include rare earth/alkaline earth oxide systems, rare earth/transition metal oxide systems, actinide oxides and the like, and various other mixed metal oxide systems.

Superemitters, when heated to a threshold temperature, emit visible or infrared radiation in a wavelength band that is related to the inner electron shell vacancy of the particular superemitter material. Radiation emitted from such superemitters is often in the form of a narrow band and can, therefore, be absorbed efficiently by a photovoltaic device, such as a silicon cell, InGaAs, and the like, to convert the radiation to an output voltage and current. The thermally-stimulated superemitters produce radiation in relatively concentrated, narrow spectral bands when compared to "blackbody" or "graybody" emitters, which typically produce a broad band thermal emission. As a result of the concentrated, narrow spectral band photon emission from such superemitters, thermophotovoltaic (TPV) power systems that are used in conjunction with such superemitters have greater conversion efficiency, i.e., conversion of photon radiation to electricity, than TPV power systems used in conjunction with blackbody emitters operated at the same heat flux. This is due to the typically broad band emissions from such device. However, blackbody emitters can be made to produce a selective spectral band photon emission by using one or more band-pass filters interposed between the emitter and the TPV power system.

Several thermophotovoltaic devices that are used to collect, select, and direct radiation are shown in FIGS. 1–4. Ideally, superemitters emit radiation having a wavelength near, i.e., slightly higher than, the photovoltaic material's band gap. For example, silicon has a band gap at about 1,100 nm, InGaAsP can be tuned to have a band gap covering a wider range, e.g., from 800 nm to about 1700 nm, and ytterbia has a band gap with a peak at 975 nm, i.e., just above the silicon band gap energy. An ytterbia-based mixed oxide emission spectrum is compared with that of holmium oxide in FIG. 5. Multilayered multiband cells made of InGaAsP and other multilayered group III–V compounds can be used to match the ytterbia and holmium based peaks shown.

Although superemitting fiber matrix burners have been developed, they have generally not been found to be effective in very high efficiency/very high fiber temperature device (as described in copending patent applications Ser. Nos. 07/860,777, now U.S. Pat. No. 5,356,487, and 07/695, 783, respectively filed on Mar. 27, 1992 and May 6, 1991) when the gas velocity hitting (impinging) the fibers exceeds a certain amount which destroys the fiber.

Figures 1A, 1B, 2, 3A:
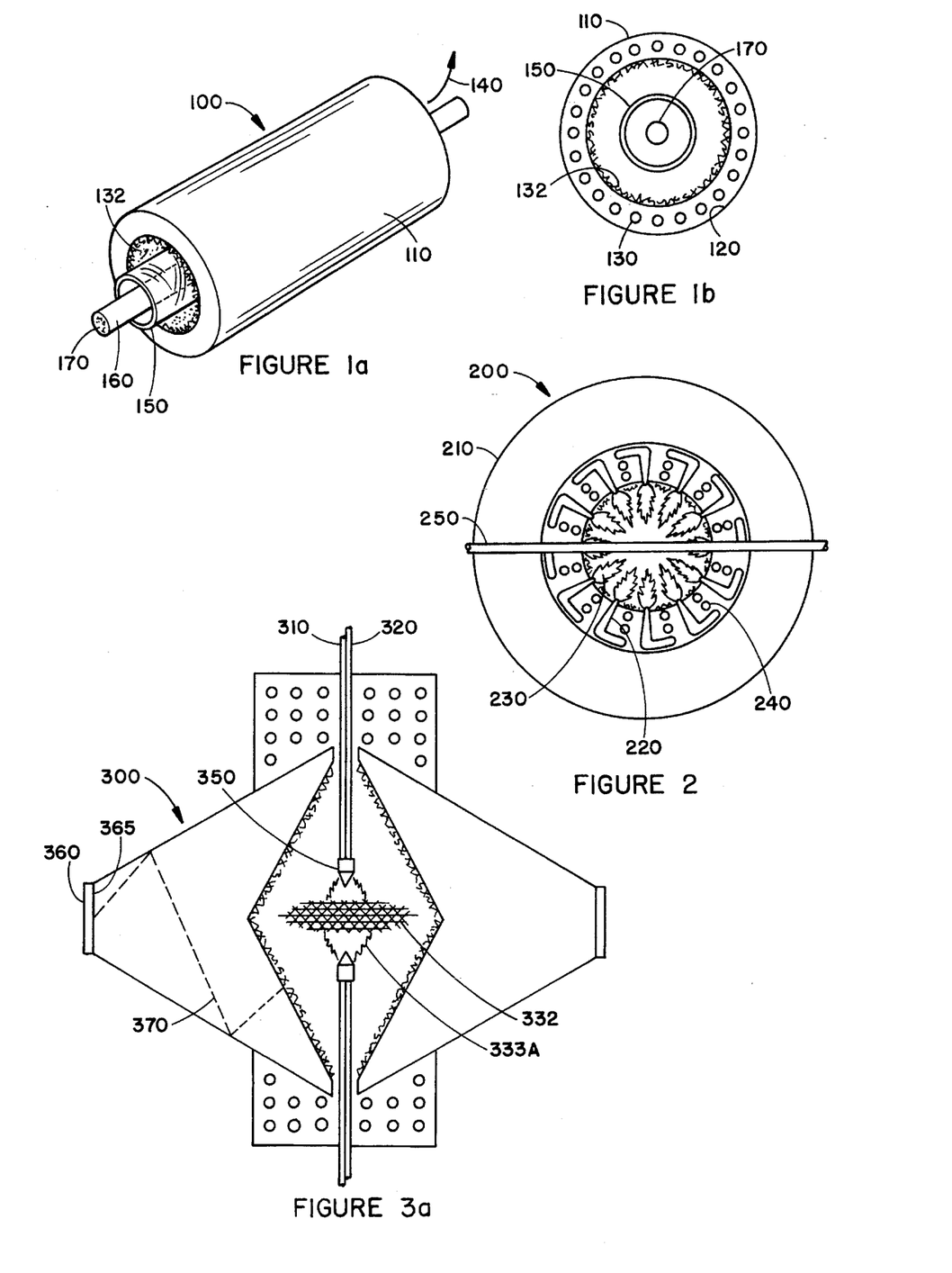
FIG. 1a is a perspective end view of a central firing cylindrical burner with light pipe.
FIG. 1b is a cross-sectional view the burner of FIG. 1a across a center of the tube.
FIG. 2 is a cutaway view of one half of a fuel injection burner as used to heat a section of a light pipe coated with an emitter.
FIG. 3a shows a thermophotovoltaic device comprising two opposing torch-type burners for heating a superemitter in the form of fibers suspended from a central area of a cone. The photons are focused through conical waveguides onto one or more targets such as photovoltaic cells.
Figure 3B:
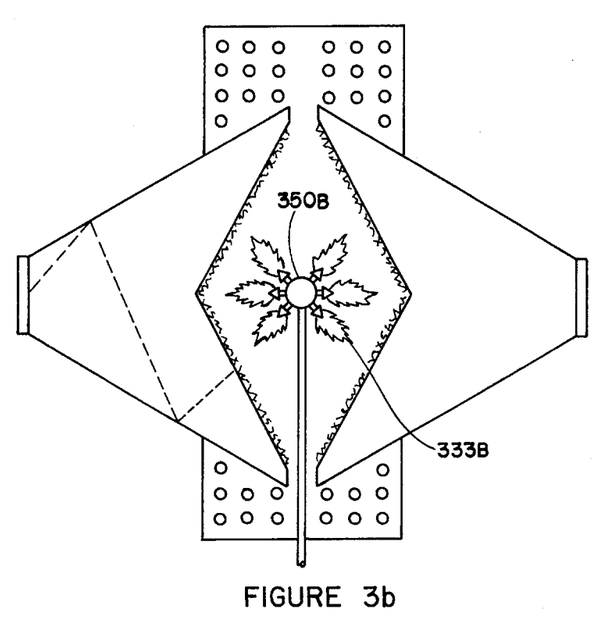
FIG. 3b shows a thermophotovoltaic device comprising a number of torches impending directly on a superemitter coated onto a waveguide surface, or a superemitter fiber pulled from the waveguide surface by use of focused laser heating.

Superemitter ceramic burners, which emit radiation in a narrow spectrum when heated above their threshold temperature offer the potential for such high-efficiency energy production for a short period of time when the gas pressure and velocity hitting the fibers are very high, i.e., sufficient to cause damage to the fibers over time. However, if the principle of opposing torches is used to provide the thermal energy needed to effect superemitter photon emission, the fibers will see very low gas velocity and will, therefore, provide a high degree of power for long periods of time without damage. Another method to produce a long lived emitter is shown in FIG. 3, wherein the superemitter is coated onto the surface of a transparent light pipe or waveguide.

It is desirable that these superemitter ceramic burners have highly active emissive surfaces. It is also desirable that these superemitters be inexpensive and easy to produce, strong and durable, and have high-temperature and high-energy density capabilities. The intensity of the light emitted from a superemitter increases dramatically with temperature.

The amount of radiant energy emitted and then collected by a photovoltaic cell used in conjunction with such superemitter will also increase dramatically with temperature if most or nearly all the photons can be collected and converted or recycled. Therefore, optical collection systems are desired to produce electric power efficiently, i.e., convert the photon emission from such superemitters to electrical energy. The efficiency of converting photon emission to electric energy increases if the thermal energy of the exhaust gas is recycled by means of a recuperator system, which transfers the thermal energy in the photons and in the exhaust gases to the incoming reactants. The recuperator may increase the temperature of the reactants above the auto-ignition point. To provide for these important energy conservation features, a fuel injection system has been invented that allows the combustion inlet temperature to reach well over auto-ignition.

There is, therefore, a need for an improved photon collection technology for a wide variety of applications such as photon sources for pumping lasers, and providing photons of specific wave bands for such purposes as photolithography, photochemical reactors, etc. and TPV energy generation.

SUMMARY OF THE INVENTION

The invention comprises various novel photon generating devices that produce and concentrate photons onto one or more targets and methods for constructing these devices. A number of examples of novel devices are presented to produce, collect, and concentrate electromagnetic radiation with a predetermined spectral characteristic depending on the specific application. These devices may also be useful for the collection of near blackbody radiation. These photon sources may be used with various targets including photovoltaic cells and the like.

Processes for preparing emissive photon generators having thermal input provided from combustion are also described. One such process comprises placing a base fiber layer solution (consisting of bonding gel, which supports fibers and porosity agents) on one side of a burner skeleton; applying a vacuum to the other side of the burner skeleton to draw the base layer fibers onto the surface of the burner skeleton and to draw the liquid component through the burner skeleton; removing the fibercoated skeleton from the base fiber layer solution, and drying the base fiber layer. An outer fiber layer may also be added to the base fiber layer by placing another fiber layer's solution in contact with the side of a burner skeleton containing the base fiber layer; applying a vacuum to the other side of the burner skeleton, to draw the liquid component through the base fiber matrix and the burner skeleton, to form a fiber matrix; removing the burner with the fibers coated onto the skeleton; drying the fiber layer(s); and firing the coated burner to sublime out porosity agents and bond the ceramic together to produce a cylindrical porous ceramic burner that focuses photons towards its center line. Optical devices such as light pipes, waveguides, or both are placed into the cylindrical cavity. When the device is fired by combustion, the fiber matrix emits and the desired photons pass into the light pipe and are directed to the target or targets.

In another embodiment of the invention, a band pass filter is placed onto the end or around the light pipe to reflect photons that are not with the selected band(s) back to the emitter, thus conserving energy and allowing the selected photons to be delivered to the target such as one or more photovoltaic cells, as shown in FIG. 1.

In another embodiment of the invention, the photon generator comprises a thin coating of emissive material on the light pipe device which is designed to focus the emitted light onto a target placed at the end of the light pipe or waveguide, as shown in FIG. 2.

Figure 4:
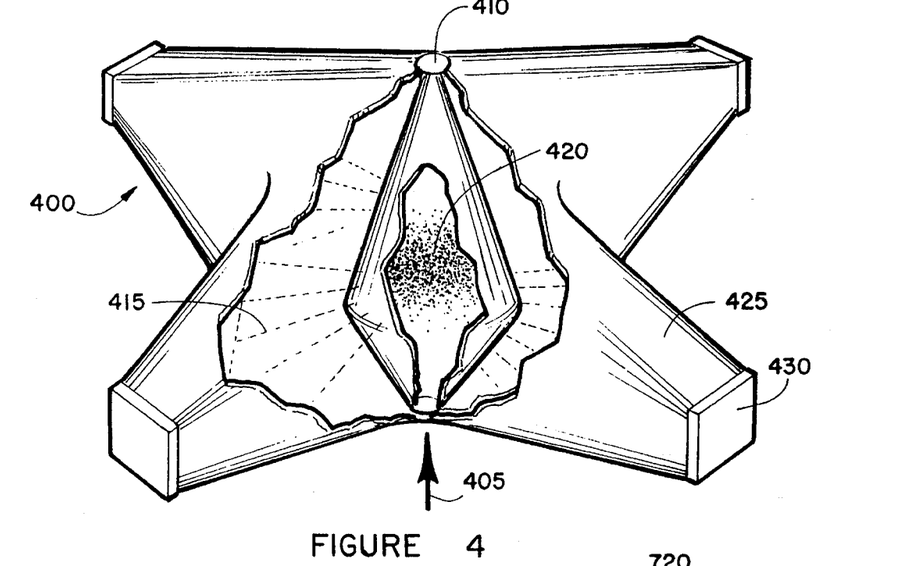
FIG. 4 shows the same thermophotovoltaic device as illustrated in FIGS. 3a and 3b except that a fluidized bed emitter is in the optical cavity section.
Figure 6:
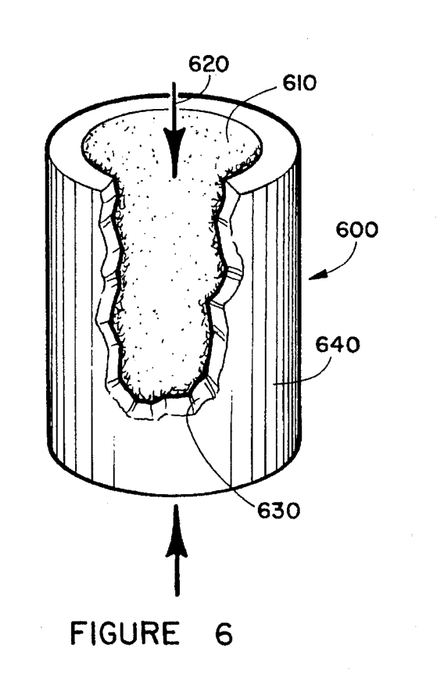
FIG. 6 illustrates two opposing oil fired burners inside a tube which is coated on an inside surface with fibers or a thin layer of superemissive material.
Figure 7:
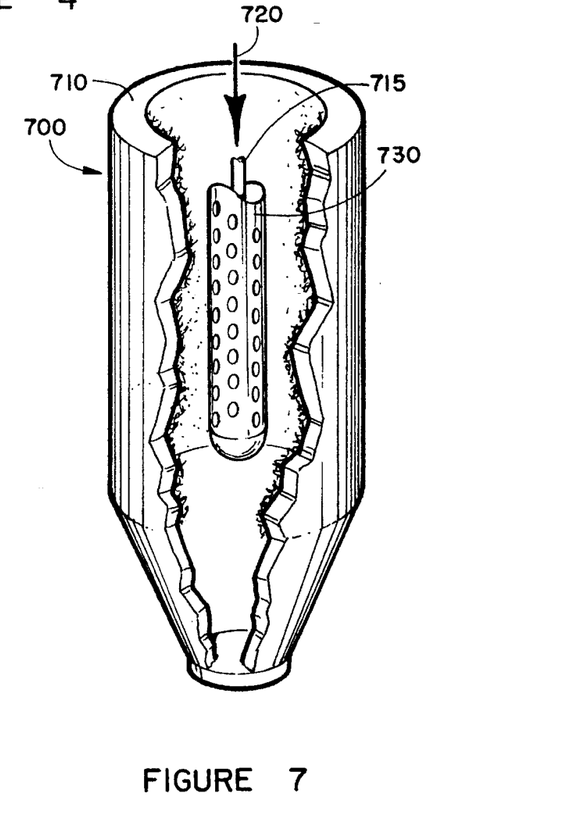
FIG. 7 illustrates a tubular burner with jets of flame impinging, at high velocity, onto a surface of the emitter. The photons generated are focused onto a target by means of a waveguide or other optical device(s)
Figure 8:
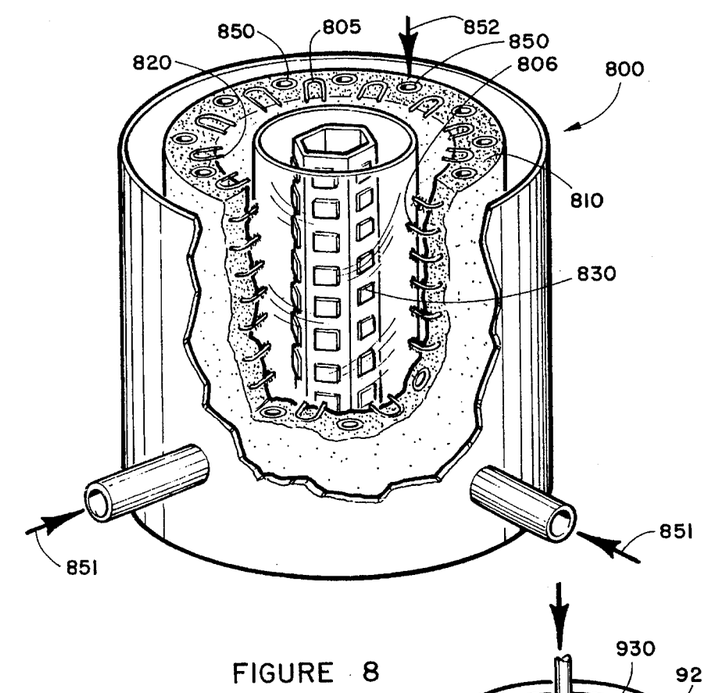
FIG. 8 shows optical quality ceramic fibers woven in the shape of a U-turn with the open ends directed to the target.

In another embodiment of the invention, the burner contains separated gas (fuel injection) and oxidizer inlets to provide a torch type burner. This fuel injection system can be used with a number of different designs, including the cylindrical centrally-focused burner shown in FIGS. 1 and 2. One specific novel design involves the use of a cone-shaped object comprising a waveguide material which does not emit significantly when heated. The large end of the cone may be heated by a torch or other means. A conical section is hollowed out and an emitter is coated onto the surface as shown in FIGS. 3 and 4. An infinite variety of similarly designed concept are feasible. If two or more of these devices are placed back to back, photon energy is redirected to the target, exhaust gas energy is transferred into the fuel and oxidizer by means of a recuperator, a very efficient photon generating system can be built, e.g., the thermophotovoltaic devices shown in FIGS. 1–4. Other embodiments are shown in FIGS. 6, 7, and 8.

BRIEF DESCRIPTION OF THE DRAWINGS

Other features, aspects and advantages of the present invention will be more fully understood when considered with respect to the following detailed description, appended claims, and accompanying drawings where:

DETAILED DESCRIPTION

The present invention relates to novel photon generators, collectors, and directors and methods of preparing such devices. FIGS. 1a and 1b illustrate the general structural features of a simple porous ceramic burner 100 formed according to principles of this invention with an optical collector 160 (such as a light pipe) and target such as a photovoltaic (PV) cell 170. The porous ceramic burner comprises a fiber layer 132, a burner skeleton, and a fuel oxidizer system.

An intermediate or base layer may be required to bond an emitter material to the optical device. The base layer is preferably any low cost material that can bond the emitter to a light pipe effectively (preferably with thermal-stimulated superemitter materials). The base layer may comprise a high temperature material such as a high temperature fiber or coating, for example, pure or doped oxide(s) of uranium, thorium, ytterbium, aluminum, gallium, yttrium, erbium, holmium, zirconium, chromium or other high-temperature oxides. A preferred base fiber layer is one made from aluminum oxide, which is inexpensive and which lasts longer under oxidative conditions than do other inexpensive materials such as carbides, silicon oxide, or aluminosilicates.

The intermediate layer functions to bond the outer material to an inner portion of the optical device. An yttria intermediate layer may be used when an optical director, i.e., a light pipe, is formed from aluminum oxide, since it is difficult to maintain a bond between ytterbia and alumina after thousands of cycles. If an optical director, i.e., light pipe, other than aluminum oxide, such as YAG, is used the intermediate layer may be omitted. When the intermediate layer is used, it preferably comprises any material which is oxidation resistant and which bonds well to both the light pipe and superemitter.

The same principles apply to fiber systems. The outer fiber layer is preferably formed from a hightemperature superemissive material. The superemitter comprises a material which has an inner electron shell vacancy such that, upon heating, causes one inner electron below to jump into the vacancy as described in U.S. Pat. Nos. 4,906,178, 4,793,799 and 4,776,895, i.e., perhaps by means of a photon-electron interaction. These patents are herein incorporated by reference. Materials suitable for use as the superemitter include a narrow band or selected emitter such as neodymium, yttrium, ytterbium, holmium, erbium, thulium, cerium-thorium, thorium-holmium, aluminum-ytterbium-yttrium mixed oxides or mixtures thereof and other materials that emit radiation by an inner electron shell transition. The use of certain materials increases the useful life, reduces corrosion, and changes the emissivity characteristics of the resultant burner to those desired for a variety of uses such as photovoltaic devices, cooking food, heating water, pumping lasers, reacting materials photochemically, etc.

One method of fabricating such burners from fiber has been described in patent application Ser. No. 07/517,699 and in U.S. Pat. Nos. 4,758,003, 4,776,895, 4,793,799, and 4,906,178.

The fibers shown in FIGS. 3a and 3b and similar devices may be made by one of several methods, e.g., using lasers to heat the material and then pulling it from the surface of the melt on the waveguide or light pipe to form a type of optically coupled whisker. Such laser-fiber methods are commercially used to produce (monofilament) optical alumina fibers. A similar type of process can be used to produce continuous small optical quality fibers that are connected to a target waveguide or light pipe. Thus, all the photons generated inside the optical fiber may be combined and directed to one or two targets. The fibers may be coated with emissive materials by one or more of the methods listed below or in a copending patent application Ser. No. 07/695,983. Alternately, the fibers in the emitter shown in FIG. 3a may be made of small fibers of emissive compositions such as described in the application and in the other cited patents, e.g., U.S. Pat. No. 4,776,895.

One method of coating a superemitter material onto structures such as fibers and waveguides is to coat one or more intermediate layers on the fiber or waveguide, such as a layer of yttria and another layer of the emitting material, such as an ytterbia containing material. This method improves the bonding of the outer layer to the coated intermediate layer for some superemitters. The process of coating the underlying structure, i.e., fiber or waveguide, with one or more intermediate layers enhances bonding of the outer superemitter and involves the use of soluble ceramic precursors or mixtures of solubles and insoluble colloidal particles such as alkoxide, nitrates, colloidal hydroxide and alkoxide and/or nitrates to coat the light pipe by spray, dip or similar process. One such coating process is the subject of a co-pending application Ser. No. 07/695,783 filed May 6,1991. The coating of the intermediate layer is followed by a drying process and then a denitration process (or similar process to solidify the soluble material), such as by exposure to ammonia to form the hydroxide or by hydrolysis with $H_2O$ and catalysis for the alkoxide case as described by J. Brinker and W. Scherer in "Sol-Gel Science", Academic Press, NY, N.Y. (1990), and the References in that book identified as 13–21 and 25–37 in Chapter 14, pages 839–880. In another method, colloidal hydroxide may be bonded directly to the oxide. Alkoxide coating methods have been extensively described in the literature, such as those for producing light pipe antireflective coatings.

One novel application of the present invention is a thermophotovoltaic (TPV) device having a fiber matrix, thin coating, or both added to the interior of a transparent solid optical tube 600, as shown in FIG. 6. The optical tube 600 comprises an outer body 640 formed from a thickness of an optically transparent material 630. The optical tube has an inside surface coated with fibers 610 of superemissive material. Two opposing oil fired torches provide fuel and oxidizer 620 from each end of the tube to effect thermal stimulation of the superemitter material.

FIG. 7 illustrates a TPV device 700 similar to that described above and illustrated in FIG. 6 comprising an optically transparent tube 710 having an inside surface coated with fibers of superemissive material. In this embodiment, fuel 720 is provided from a single end of the tube into the tube via a single fuel injection line 715 and mixed with oxidant within a centrally located burner 730 to provide thermal energy to effect stimulation of the superemitter material.

An oxidant such as oxygen or air may be used at temperatures well above the ignition point, making recuperation and fuel injection efficient and practical. The recuperator (330), shown in FIGS. 3a and 3b may optionally contain a catalytic surface which may be used to further reduce NOx. Also, the air may be replaced with or enriched with oxygen to further increase the temperature of combustion and the energy density (watts/$m^2$) output of this design. The recuperator provides a method to significantly increase efficiency by recycling the energy in the exhaust products.

A central-focus firing cylindrical burner with fuel injection 100 is depicted in FIGS. 1a and 1b. Hot oxidant enters an outer distribution chamber 110 under pressure and flows through a porous structural member 120. As shown in FIG. 1b, the porous structural member 120 comprises fuel injection tubes 130 disposed therein. A fiber matrix 132 is disposed along an inside surface portion of the porous structural member. Fuel enters the fiber matrix 132 through fuel injection tubes 130 and is combusted upon mixing with the hot oxidant. Resulting exhaust products 140 move through an exhaust chamber 140 disposed between the porous structural member and a filter 150. One or more targets 170, i.e., photovoltaic cells, is protected from the combustion products by the filter 150. Narrow band radiation emitted from the superemitter fiber matrix 132 passes through the filter 150 and focuses onto a light pipe 160, which in turn directs the photons to the photovoltaic cells 170. A fluid (optionally) flows inside the optical tube (not shown) to cool the tube. Water may flow on the outside of the PV cells to keep them cool (not shown) or fuel and/or oxidizer may be used to further conserve energy.

FIG. 2 is a cutaway view of one half of a fuel injection burner 200 as used to heat a section of a light pipe 250 coated with an emitter (not shown). The burner 200 comprises a number of fuel injectors 220 disposed within a cylindrical body portion 210 of the burner. The injectors are oriented with their ends directed toward an axis running along the length of the burner so that flames 230 projecting from each fuel injector are directed to a central portion of the burner. Oxidant air enters the burner 200 via tubes 240 disposed within a porous structure.

FIG. 3a illustrates thermophotovoltaic device 300 comprising dual opposing torch-type burners 350 for heating a superemitter in the form of fibers 332 suspended from a central area of a cone. A fuel supply 310 and oxidant air supply 320 is routed to each burner 350 and combusted to form a flame 333A impending directly on the fibers. Photons 370 emitted from the fibers 332 focused through conical waveguides to end portions 365 and onto one or more targets 360, such as photovoltaic cells.

FIG. 3b illustrates a thermophotovoltaic device similar to that disclosed above and illustrated in FIG. 3a, comprising a number of torches 350B projecting flames 333B impending directly on a superemitter coated onto a waveguide surface, or a superemitter fiber pulled from the waveguide surface by use of focused laser heating.

Advantages of the optical light pipe systems constructed according to principles of this invention, including those where optical fibers have been pulled or grown from the melt, are that they: (1) are relatively inexpensive to construct; (2) are strong; (3) are durable; (4) are light weight; (5) achieve high radiation power densities of desired spectral wavelength(s); and (7) provide high energy density and efficiency.

Other preferred embodiments of the invention are capable of delivering high photon fluxes to one or more target(s) as shown in FIGS. 2–4 and 6 and may be constructed of bundles of optical fibers. The optical fibers may be attached to a lens or waveguide or other means to collect photons emitted from the superemitter materials. Selected wavelength bands of photons may be used to match the various PV cells, e.g., silicon photovoltaic cells having a band gap of about 1,100 nm., or multi-layer cells can be used in conjunction with multiband emitters. The useful photon fluxes from these multiband emitters are many times those produced by conventional photon sources and may be easily delivered to a variety of targets, such as photovoltaic cells, chemical reactors, heating devices, and optical collection means for lighting or growing plants and pumping other devices such as lasers. Further concentration of photons in an optical fiber system is possible using waveguides and other commercial devices. High electric power conversion efficiencies of from about 10 to 80 percent can be achieved from photon radiation emitted in the selected wavelength bands.

The estimates of efficiency of the TPV systems and other similar systems are based on the novel design described in FIGS. 1–4. The principle that electromagnetic emissions increase dramatically with temperature has been well established in physics by Stefan, e.g., the equation $I_{(t)} = \sigma \epsilon T^N$, where $\sigma$ is a constant, $\epsilon$, the causivity, is a number between 0 and 1, and N equals 4 for a near blackbody. Using this principle, an estimate of power potential using data from the TPV measurements in the laboratory has shown N=7 to 14, depending upon the chemical composition of the emitter and the temperature. Recovering some of the exhaust gas energy raises the pre-combustion gas temperature. Similar results were obtained by the American Gas Association (see A.G.A. Research's Bulletin No. 91), i.e., the intensity of light emission increases with the 10th power of temperature for 99% thoria and 1% ceria emitters. Nelson estimates that emission for ytterbia increases with the 8th power of temperature. It is estimated that superemitters (assuming e is constant) go up as N increases from the 7th to the 14th power. Using the recuperation concept or oxygen to raise the temperature, very high photon fluxes can be obtained.

The recuperator burner and emitter may be designed and constructed as a unit. One method of producing a photon generator consisting of a single recuperator burner emitter system includes the following steps: 1) impregnating an organic foam with soluble precursor salts; 2) weaving fibers such as fiber optics or rayon impregnated with superemitter precursor material as described in several earlier patents, e.g., U.S. Pat. No. 4,776,895; 3) drying the fibers; 4) treating the fibers with ammonia to reduce nitrates to hydroxide; and 5) heating the fibers to convert hydroxide to oxide.

In another variation of the invention, a burner recuperator foam structure may be fabricated by weaving optical fibers into a green foam as shown in FIG. 8 as 810, then heating the system to burn out the organics, forming a ceramic foam with fibers or preferred type, orientation, and density. The fibers may be coated with the same various formulas as previously described.

In another embodiment of the invention, rayon may be woven into the organic foam before impregnation. However, this method may use more superemitter material. Generally, methods which reduce the cost of superemitters are preferred. However, sometimes improved product and lower process cost are important, depending on the volume and value added.

The idea of inverting the burner system and collecting the photons in a light pipe or wave guide has two main benefits, it increases the ratio of emissive surface area to collector area, thereby reducing the number of photovoltaics required because a higher photon flux can be obtained, and it results in a more compact design (higher energy density) which will cost less for certain type of hybrid electric vehicles because the energy package will occupy less space and be more durable.

FIG. 8 shows a foam burner system 800 in which fibers 805 are woven into foam 810 so that open ends 820 of the fiber 805 are directed toward a target 830. The fuel and oxidizer entering means into the foam may comprise tubes 850 for the oxidizer 851 and fuel 852 which may be premixed in a very small chamber (not shown) at very high speed to prevent combustion before exiting the chamber to produce a very hot flame (not shown). The flames may be designed so that they oppose each other in the area of the fiber to prevent damage to the fibers. The fibers 805 may be coated with a superemissive material 806. The emitted photons (not shown) are either emitted towards the target or at some angle. The photons that get trapped in the fiber 805 will pass into the foam and out the other end of the U-turn and be directed to the target, thus providing increased photon flux at the target.

Another embodiment of the invention is a fluidized bed combuster 400, as shown in FIG. 4. Fuel and oxidizer enter the combuster through a bottom opening 405 and the resultant exhaust products of the combustion exit the combuster via top opening 410. Photons 415 are emitted from beads 420 disposed within the combuster that are coated with or otherwise comprise superemitter material. The photons are directed to one or more targets 430 by a waveguide 425 and are converted to electricity by PV cells located at one or more targets 430.

FIGS. 3a and 3b illustrate other embodiments of the invention using superemissive fibers made by the process described in U.S. Pat. No. 4,776,895 or by the laser process described above.

Figure 5:
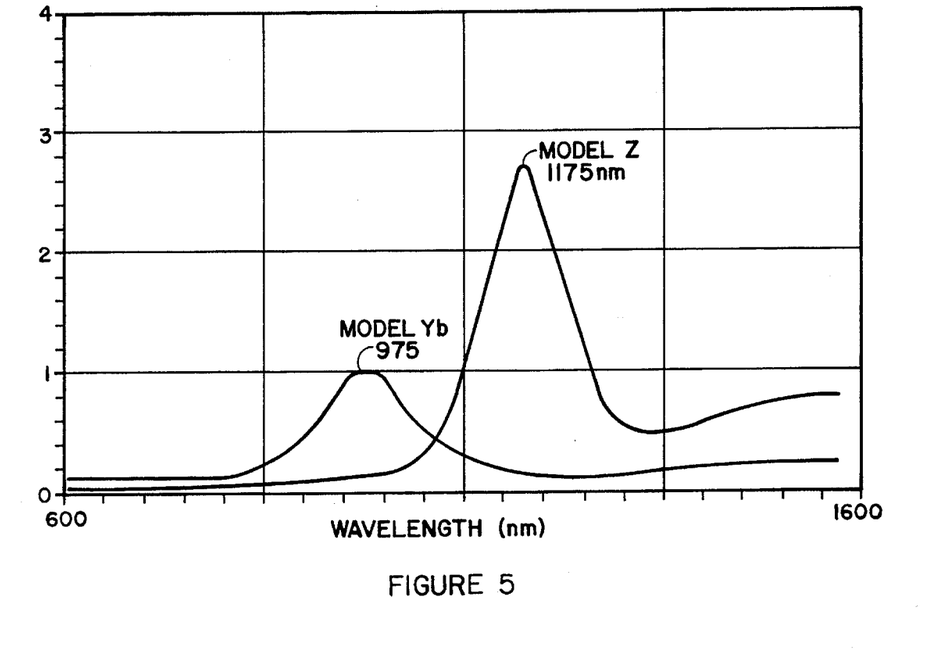
FIG. 5 illustrates the spectral emittance of two different ceramic superemitters when heated above the thermally stimulated quantum emission temperature using the same amount of gas (1500 BTU)

A holmium oxide emitter has demonstrated an ability to produce more than twice the absolute radiant intensity that of ytterbia, per Btu of heat, as shown in FIG. 5. Advanced photovoltaic materials such as InGa AlAS, InGaAsP, and similar group III–V compounds (InGaAs) used with this emitter are expected to produce a TPV generator twice as efficient as one with silicon based PV cells.

The recuperation temperature of a normal air/fuel gas premix system is limited by its combustion temperature. For natural gas in air, this combustion temperature is somewhere below 800° C. In order to increase the emissive fiber temperature using recuperation, it is desirable to have the combustion air as hot as possible without preignition of the mixture. FIGS. 2 and 3 depict a possible configuration where fuel and oxidizer are injected through tubes into the premix chamber as in a torch. The recuperated air can then be heated to 1000° C. without fear of preignition if the premix chamber is small and the velocity of the reactants is high enough.

Figure 9:
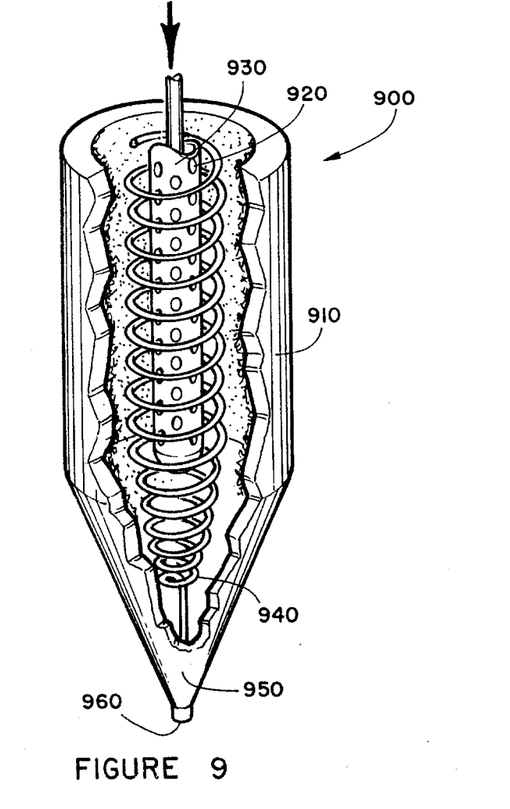
FIG. 9 illustrates the use of continuous optical fibers, which may comprise superemitter materials or may be coated with a superemitter materials. The use of optical fibers as the enclosure and emitter offers the unique function of almost total photon capture into one or more targets.

FIG. 9 illustrates an TPV device 900 comprising an optical waveguide cavity 910, in which the primary emitter comprises one or more optical fiber emitters 940, which may comprise a superemitter or may be coated with such material (not shown). The photons (not shown) are emitted from the emissive material when heated above a certain temperature and are either trapped in the optical fiber 940 or the outer waveguide 910, which alternately may comprise a similar form made from the optical fibers (not shown), and thus in either case the photons will be directed to the target 960 by waveguide lens 950, or optical fiber(s). The fuel and air are mixed in the premix chamber,(not Shown) within the burner tube 930 and the flame is produced as the reactants exit the holes 920, and the impinge on the superemitter material-optical fiber system 940. The photons produced are then focused onto the target.

Although the above exemplary embodiments of a ceramic burner comprising the use superemissive materials disposed on light pipes-and waveguides, and method for making the same, has been specifically described and illustrated, variations will be apparent to those skilled in the art. It is, therefore, to be understood that the present invention is not intended to be limited to the particular embodiments described above. The scope of the invention is defined in part by the following claims.

What is claimed is:

1. A device for generating photons comprising:
    a burner for effecting combustion of a fuel source and oxidizer therein;
    a photon admissive fiber matrix positioned within the burner, wherein the fiber matrix includes a supersmissive material that emits radiation of a specific wavelength when heated above a threshold temperature;
    means for coilcoting radiation emitted by the fiber matrix and guiding the radiation to one or more targets.

2. A device as recited in claim 1 wherein the means for collecting and guiding radiation is one or more optical fibers disposed centrally within the burner adjacent the fiber matrix.

3. A device as recited in claim 2 wherein each target is positioned at an end portion of the optical fibers.

4. A device as recited in claim 1 wherein a photovoltaic cell is positioned adjacent a said one or more targets to convert radiation directed to the said one or more targets to electricity.

5. A device as recited in claim 1 wherein the fiber matrix is of a porous construction to allow passage of the fuel source and oxidizer therethrough, wherein the fibers are formed from the group of supersmissive materials consisting of silicone dioxide, aluminum oxide, gallium oxide, thorium oxide, yttrium oxide, holmium oxide, ytterbium oxide, chromium oxibium oxide, zirconium oxide, borides, nitrides, carbides, silicades, and mixtures thereof.

6. A device as recited in claim 1 wherein the fiber matrix comprises:
    a base fiber layer positioned adjacent an inside wall portion of the burner system;
    an intermediate fiber layer disposed on the base fiber layer; and
    an outer fiber layer disposed on the intermediate fiber layer.

7. A device as recited in claim 6 wherein the intermediate layer is formed from the group of supersmissive materials selected from the group of metal oxides consisting of yttrium oxide, uranium oxide, thorium oxide, ytterbium oxide, gallium oxide, erbium oxide, holmium oxide, zirconium oxide, chromium oxide, strontium oxide, calcium oxide, barium oxide, neodymium oxide, scandium oxide, thulium oxide, aluminum oxide, magnesium oxide and mixtures thereof.

8. A photon generating device comprising:
    a burner having a generally cylindrical housing, wherein the housing includes at least one fuel source inlet;
    a layer of foam disposed within the housing adjacent an inside wall of the housing;
    a number of fuel injection passages disposed within the foam, wherein a fuel source is routed to the fuel injection passages via the fuel source inlet;
    a number of photon fibers disposed within the foam; and
    a target positioned centrally within the burner housing.

9. A device as recited in claim 8 wherein the fibers are oriented within the foam layer to emit photons in a direction toward the target.

10. A device as recited in claim 9 wherein the fibers are coated with a supersmissive material selected from the group consisting of yttrium oxide, uranium oxide, thorium oxide, ytterbium oxide, gallium oxide, erbium oxide, holmium oxide, zirconium oxide, chromium oxide, strontium oxide, calcium oxide, barium oxide, neodymium oxide, scandium oxide, thulium oxide, aluminum oxide, magnesium oxide and mixtures thereof.

11. A photon generating device comprising:
    a burner for affecting the combustion of a fuel source and oxidant therein, wherein the burner is formed from a porous ceramic material;
    a photon emitter disposed within the burner, wherein the emitter is designed to emit photons at a predetermined wavelength after reaching a threshold temperature; and
    a collector disposed within the burner for collecting the photons emitted by the emitter and directing the photons to one or more targets.

12. A device as recited in claim 11 wherein the burner includes a number of fuel injection passages disposed between an inside wall portion of the burner and an outside wall portion, wherein the fuel injection passages effect distribution of a fuel source within the burner to effect combustion within a combustion zone in the burner.

13. A device as recited in claim 12 wherein the photon emitter is a photon emissive fiber matrix disposed adjacent the inside wall of the burner, wherein the matrix is formed from a supersmissive material.

14. A device as recited in claim 13 wherein the collector is a light pipe disposed centrally within the burner adjacent the fiber matrix, wherein at least one end of the light pipe is positioned adjacent a target.

15. A device as recited in claim 14 wherein a photon filter is disposed between the fiber matrix and the light pipe to ensure that photons entering the light pipe are within a predetermined wavelength.

16. A device as recited in claim 14 wherein a photovoltaic cell is positioned adjacent the target to generate electricity from photons exiting the light pipe.

17. A device as recited in claim 11 wherein the photon emitter is in the form of a porous ceramic foam layer disposed adjacent an inside wall of the burner, wherein the foam layer includes a number of photon emissive fibers therein.

18. A device as recited in claim 17 wherein a number of fuel injection passages are disposed within the foam layer to effect distribution of a fuel source through the foam to effect combustion within a combustion zone within the burner.

19. A device as recited in claim 17 wherein the fibers are oriented along a surface portion of the foam layer with so that photons are emitted toward a target that is centrally disposed within the burner.

20. A device as recited in claim 11 wherein the photon emitter is a photon amissire fiber matrix disposed adjacent an inside wall of the burner.

21. A device as recited in claim 20 comprising a burner tube disposed centrally within the burner and at least one fuel injection tube disposed centrally within the burner tube.

22. A device as recited in claim 21 wherein the photon collector is one or more optic fibers disposed around an outside surface of the burner tube adjacent the fiber matrix, wherein at least one end portion of each optic fiber is positioned adjacent a target.

23. A device as recited in claim 22 comprising a photovoltaic cell positioned adjacent the target to generate electricity from photons exiting the optic fibers.

24. A device as recited in claim 21 wherein the burner tube comprises a plurality of holes to accommodate passage of a fuel source from the fuel injection tube therethrough to effect dispersement of the fuel source from the burner to a combustion zone within the burner.

25. A photon generating device comprising:

a burner made from a porous ceramic material, wherein the burner includes a number of fuel injection passages disposed between an inside and outside burner wall;

a photon emissive fiber matrix disposed along the inside wall of the burner, wherein the fiber matrix effects emission of photons within a predetermined wavelength when subjected to a threshold temperature caused by combustion of a fuel source and an oxidant within the burner;

a light pipe disposed axially within a central portion of the burner for collecting photons emitted from the faber matrix and directing it to one or more targets positioned at an end portion; and a photon filter interposed between the light pipe and the fiber matrix.

26. A device as recited in claim 25 wherein the fiber matrix comprises:

a base layer disposed against the inside burner wall;

an intermediate layer disposed on the base layer; and an outer layer disposed on the intermediate layer.

27. A device as recited in claim 26 wherein the outer layer is formed from a suppersmissive material selected from the group of oxides consisting of yttrium oxide, uranium oxide, thorium oxide, ytterbium oxide, gallium oxide, erbium oxide, holmium oxide, zirconium oxide, chromium oxide, strontium oxide, calcium oxide, barium oxide, neodymium oxide, scandium oxide, thulium oxide, aluminum oxide, magnesium oxide and mixtures thereof.

28. A device as recited in claim 27 wherein the intermediate layer is coated-with a suppersmissive material.

29. A device as recited in claim 25 comprising a photovoltaic device positioned adjacent an end portion of the light pipe to generate electricity from photons exiting the light pipe.

30. A photon generating device comprising:

a thermal input system;

a photon emitter disposed within the thermal input device that emits photons at a specific wavelength after being heated above a threshold temperature by the thermal input device;

an optical photon collector disposed within the thermal input system adjacent the photon emitter; and a target disposed adjacent a photon output portion of the collector, wherein the device has a geometry such that the photon output to the target per Btu thermal input is greater than 10 percent.

31. The device as recited in claim 30 wherein the thermal input system comprises a combustion chamber configured to focus a flame formed by the combustion of a fuel source and an oxidant on the emitter with a geometry such that photons emitted by the emitter are either trapped inside the optical photon collector or are captured by a burner recuperator system disposed within the device.

32. The device as recited in claim 31 further comprising a low $NO_x$ catalyst in the recuperator.

33. The device as recited in claim 31 comprising separate fuel and air chambers to keep the air and fuel separated until combustion at a predetermined zone of the emissive coating, and means to preheat the air above an autoignition point of a fuel-air mixture.

34. The device as recited in claim 30 comprising a photovoltaic cell disposed adjacent the target, and a heat exchanger to collect any excess thermal input and transfer it to a heat transfer medium.

35. The device as recited in claim 30 wherein the photon emitter comprises a fluidized bed of particles.

36. The device as recited in claim 30 wherein the thermal source is a combustion burner system.

37. A method of constructing a porous ceramic burner comprising the steps of:

placing a base fiber layer mixture or slurry on one side of a burner skeleton;

applying a vacuum to a side of the burner skeleton opposite the base fiber mixture to draw the base layer fibers onto the surface of the burner skeleton;

drawing a liquid component of the base fiber layer through the burner skeleton by the application of the vacuum to form a base fiber layer on the burner skeleton;

placing an outer fiber layer mixture onto the base fiber layer;

applying a vacuum to the side of the burner skeleton opposite the base fiber layer to draw the outer layer fibers onto the surface of the base fiber layer and drawing the liquid component of the outer fiber layer mixture through the base fiber layer and the burner skeleton to form an outer fiber layer;

drying the base and outer fiber layers; and firing burner skeleton to sublime the base and outer fiber layers to produce a bonded porous ceramic burner.

\* \* \* \* \*

UNITED STATES PATENT AND TRADEMARK OFFICE
CERTIFICATE OF CORRECTION

PATENT NO. : 5,503,685
DATED : April 2, 1996
INVENTOR(S) : Mark K. Goldstein

It is certified that error appears in the above-indentified patent and that said Letters Patent is hereby corrected as shown below:

Column 1, lines 31-32, change "valance" to -- valence --.

Column 2, line 7, change "copending" to -- co-pending --.
Column 2, line 7, change "applications" to -- application --.
Column 2, line 55, after "etc." insert a comma.

Column 3, line 43, change "centrally-focused" to -- centrally focused --.
Column 3, line 49, change "concept" to -- concepts --.
Column 3, line 63, change "where" to -- wherein --.
Column 3, line 66, after "view" insert -- of --.

Column 4, line 35, change "materials" to --material --.

Column 5, line 9, change "hightemperature" to -- high temperature --.
Column 5, line 43, change "copending" to -- co-pending --.

Column 6, line 30, change "NOx" to -- $No_x$ --.

Column 7, line 19, change "light weight" to -- lightweight --.
Column 7, line 31, change "1,100 nm.," to -- 1100 nm, --.

Column 8, line 29, change "type" to -- types --.
Column 8, line 64, after "intensity" insert -- than --.

UNITED STATES PATENT AND TRADEMARK OFFICE
CERTIFICATE OF CORRECTION

PATENT NO. : 5,503,685
DATED : April 2, 1996
INVENTOR(S) : Mark K. Goldstein

It is certified that error appears in the above-indentified patent and that said Letters Patent is hereby corrected as shown below:

```
Column 9, line 14, change "an" (first occurrence)
          to -- a --.
Column 9, line 25, change "chamber,(not Shown)"
          to -- chamber (not shown) --.
Column 9, line 27, before "impinge" delete "the".
Column 9, line 31, before "superemissive" insert -- of --.
Column 9, line 32, change "pipes-and" to -- pipes and --.
Column 9, line 44, change "admissive" to -- emissive --.
Column 9, lines 44-45, change "supersmissive" to
          -- superemissive --.
Column 9, line 48, change "coilcoting" to
          -- collecting --.
Column 9, line 63, change "supersmissive" to
          -- superemissive --.
Column 9, line 66, change "oxibium oxide" to
          -- oxide, erbium oxide --.
Column 9, line 67, change "silicades" to -- silicides --.

Column 10, line 10, change "supersmissive" to
          -- superemissive --.
Column 10, line 26, before "fibers" insert
          -- emissive --.
Column 10, line 32, change "supersmissive" to
          -- superemissive --.
Column 10, line 40, change "affecting" to
          -- effecting --.
Column 10, line 59, change "supersmissive" to
          -- superemissive --.
```

UNITED STATES PATENT AND TRADEMARK OFFICE
CERTIFICATE OF CORRECTION

PATENT NO. : 5,503,685
DATED : April 2, 1996
INVENTOR(S) : Mark K. Goldstein

It is certified that error appears in the above-indentified patent and that said Letters Patent is hereby corrected as shown below:

```
Column 11, line 14, after "layer" delete "with".
Column 11, line 18, change amissire" to -- emissive --.
Column 11, line 48, change "faber" to -- fiber --.
Column 11, line 59, change "suppersmissive" to
        -- superemissive --.

Column 12, line 2, after ""coated" delete the hyphen, and
        change "suppersmissive" to -- superemissive --.
```

Signed and Sealed this

Twelfth Day of November, 1996

Attest:

BRUCE LEHMAN

*Attesting Officer*      Commissioner of Patents and Trademarks